June 23, 1931.  F. BURDICK  1,811,073

SPRING WINDING FISHING REEL

Filed March 7, 1930

INVENTOR
Frank Burdick
BY Chappell & Earl
ATTORNEYS

Patented June 23, 1931

1,811,073

UNITED STATES PATENT OFFICE

FRANK BURDICK, OF KALAMAZOO, MICHIGAN, ASSIGNOR TO SHAKESPEARE COMPANY, OF KALAMAZOO, MICHIGAN

SPRING WINDING FISHING REEL

Application filed March 7, 1930. Serial No. 433,869.

The main object of this invention is to provide in a spring winding fishing reel an improved winding mechanism which is silent in its operation.

A further object is to provide a structure having these advantages which is simple and compact and has relatively few parts.

Objects relating to details and economies of my invention will appear from the description to follow. The invention is defined and pointed out in the claims.

A structure which is a preferred embodiment of my invention is illustrated in the accompanying drawings, in which.

Figure 1:
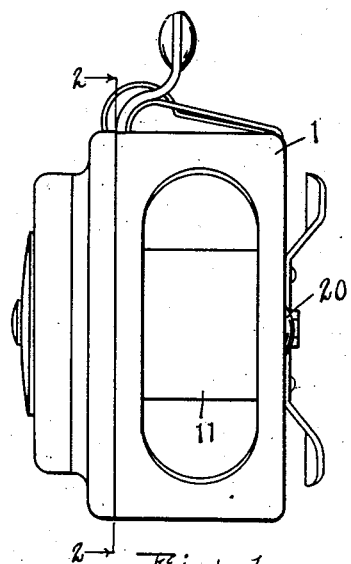
Fig. 1 is an elevation of a fishing reel embodying the features of my invention.

In the accompanying drawings I have illustrated my improvements as embodied in a spring winding fishing reel of the type shown in the patent to Russell, No. 1,510,904 issued October 7, 1924.

The frame or casing comprises a cup-shaped member 1 partially cut away at its periphery and supporting at one end the gear plate 2 which is secured to the casing part 3 having a flange 4 abutting an edge of the member 1.

The spring case 5 is also cup-shaped in form.

The spindle or staff 6 is connected to the spring casing to rotate therewith. The driving spring 7 is arranged in this casing, the inner end of the spring being connected to the ratchet member 8 rotatable on the spindle and coacting with the ratchet member 9 on the driving gear 10. This gear is connected to the spool 11 rotatably mounted on the spindle 6 by means of a train of gears consisting of the pinion 12 on the spool, the gear 13 meshing with this pinion, the gear 14 meshing with the driving gear 10. The outer end of the spring is connected to the casing at 15.

Figure 2:
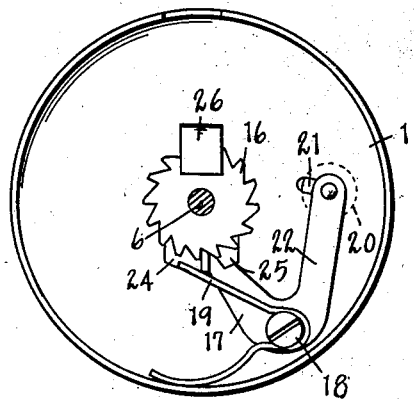
Fig. 2 is a fragmentary view on line 2—2 of Fig. 1 with the spool driving gear omitted.
Figure 3:
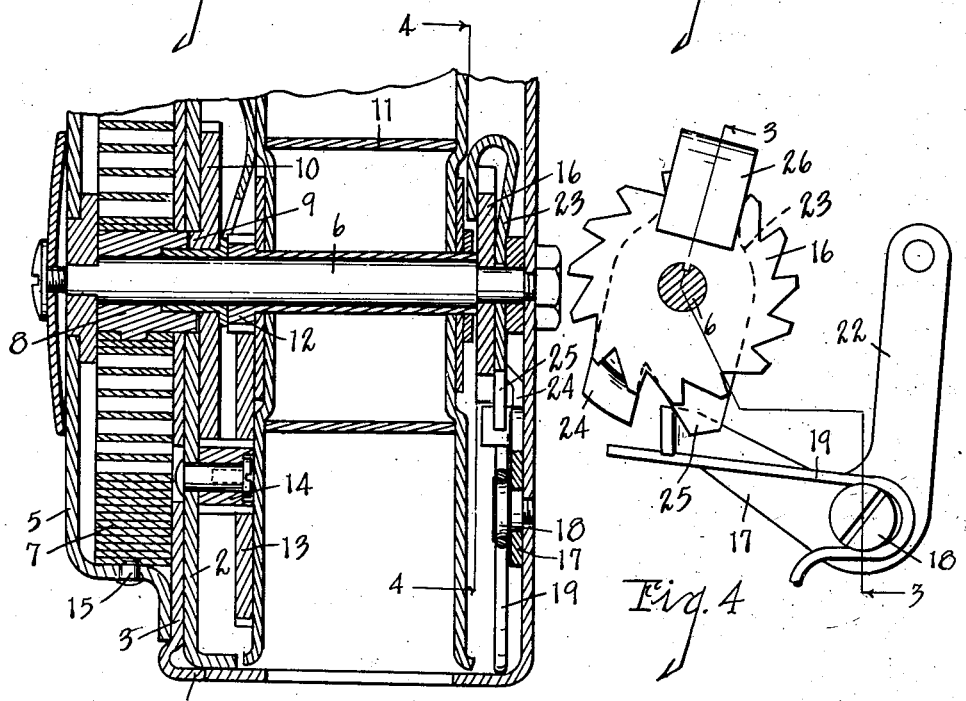
Fig. 3 is a fragmentary view mainly in section on line 3—3 of Fig. 4.
Figure 4:
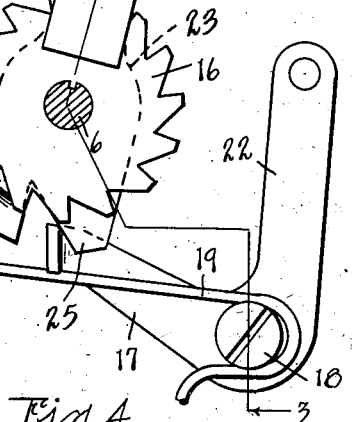
Fig. 4 is a fragmentary view in section on line 4—4 of Fig. 3.

The spindle 6 is provided with a winding ratchet 16, the pawl 17 being pivoted at 18 to coact with this ratchet. The pawl is urged into engagement with the ratchet by the spring 19. A finger button 20, shown by dotted lines in Fig. 2, is mounted in the slot 21 and connected to the arm 22 on the pawl so that the ratchet may be manually disengaged.

To automatically release the pawl during winding operation and thereby prevent the noise incident to the pawl passing from tooth to tooth of the ratchet, I provide a releasing member 23 which is pivotally mounted on the spindle at the side of the ratchet wheel with one end 24 projecting beyond the same and having a V-shaped notch therein engaged by the pawl. The edges of this notch serve as stops limiting the movement of the releasing member. The edge 25 is inclined preferably at an angle with one edge of the ratchet teeth and acts as a cam when the releasing member is rotated for shifting the pawl to disengaging position.

The other end of the releasing member is extended into a U-shaped spring 26, the end of which overlaps and frictionally engages the side of the ratchet wheel so that the releasing member is frictionally connected to the winding mechanism to be rotated therewith and on the rotation of the ratchet wheel during the winding operation, the pawl is disengaged from the ratchet wheel and retained in disengagement until the winding is discontinued or the winding stress is discontinued which permits a backward rotation of the spindle carrying the releasing member with it and allowing the pawl to engage the ratchet.

With the parts thus arranged the pawl is automatically disengaged from the ratchet during the winding of the reel and automatically re-engages when the winding is discontinued thus avoiding wear on the ratchet and the noise incident to the pawl clicking over the ratchet teeth.

I have illustrated and described my improvements in a form in which I have embodied the same in practice. I have not attempted to illustrate or describe other embodiments as it is believed that this disclosure will enable those skilled in the art to embody or adapt my improvements as may be desired.

Having thus described my invention, what I claim as new and desire to secure by Letters Patent, is:

1. The combination in a spring winding fishing reel comprising a spool and spool driving spring, of means for winding said spring comprising a spindle, a ratchet wheel rotating with said spindle, a pivotally mounted spring actuated pawl coacting with said ratchet wheel, and a pawl releasing member pivotally mounted on said spindle at the side of said ratchet wheel, one end of said releasing member projecting beyond the periphery of the ratchet wheel and having a notch therein with which the pawl is engaged, the edges of the notch constituting stops limiting the rotative movement of said releasing member, one edge of the notch constituting a cam acting to shift the pawl to disengaging position, the other end of said releasing member terminating in a curved spring embracing the ratchet and in overlapping frictional engagement with the side thereof.

2. The combination in a spring winding fishing reel comprising a spool and spool driving spring, of means for winding said spring comprising a spindle, a ratchet wheel rotating with said spindle, a pivotally mounted spring actuated pawl coacting with said ratchet wheel, and a pawl releasing member pivotally mounted on said spindle at the side of said ratchet wheel and having frictional engagement therewith, one end of said releasing member projecting beyond the periphery of the ratchet wheel and having a notch therein with which the pawl is engaged, the edges of the notch constituting stops limiting the rotative movement of said releasing member, one edge of the notch constituting a cam acting to shift the pawl to disengaging position.

3. The combination in a spring winding fishing reel comprising a spool and spool driving spring, of means for winding said spring comprising a spindle, a ratchet wheel rotating with said spindle, a pawl coacting with said ratchet wheel, and a pawl releasing member pivotally mounted on said spindle at the side of said ratchet wheel for limited rotative movement and having frictional actuating engagement with said ratchet wheel and coacting with said pawl to disengage the same when the ratchet wheel is rotated in spring winding direction.

4. In a spring wind fishing reel, the combination of a frame, a spool, a driving spring having driving connection with said spool, a winding ratchet, a coacting spring engaged pawl, and a pivotally mounted pawl releasing member operatively associated with said pawl and having frictional engagement with said ratchet wheel whereby on rotation of said ratchet wheel in winding direction said pawl is automatically shifted to disengaged position.

5. The combination in a spring winding fishing reel comprising a spool and spool driving spring, of means for winding said spring comprising a spindle, a ratchet wheel rotating with said spindle, a pawl coacting with said ratchet wheel, and a pawl releasing member mounted on said spindle and having a frictional driving connection therewith and coacting with said pawl to disengage the same when the spindle is rotated in spring winding direction.

6. The combination in a spring winding fishing reel comprising a spool and spool driving spring, of means for winding said spring comprising a spindle, a ratchet wheel rotating with said spindle, a pawl coacting with said ratchet wheel, and a pawl releasing member mounted on said spindle for limited rotative movement and coacting with said pawl to disengage the same on rotation of said spindle in spring winding direction.

7. In a spring wind fishing reel, the combination of a frame, a spool, a driving spring having driving connection with said spool, winding means for said spring provided with a ratchet wheel, a coacting pawl, and a pawl releasing member operatively associated with said pawl and having a frictional driving connection to said winding means whereby on rotation of said ratchet wheel in winding direction said pawl is automatically shifted to disengaged position.

8. In a spring wind fishing reel, the combination of a frame, a spool, a driving spring having driving connection with said spool, winding means for said spring provided with a ratchet wheel, a coacting pawl, and a pawl releasing member operatively associated with said pawl and winding means whereby on rotation of said ratchet wheel in winding direction said pawl is automatically shifted to disengaged position.

In witness whereof I have hereunto set my hand.

FRANK BURDICK.